United States Patent
Hayes

(10) Patent No.: US 7,719,209 B2
(45) Date of Patent: May 18, 2010

(54) LIGHTING APPARATUS AND METHOD

(75) Inventor: Stephen Bryce Hayes, 26 Richmond Road, Cambridge (GB) CB4 3PU

(73) Assignees: Stephen Bryce Hayes, Cambridge (GB); Outside In (Cambridge) Limited, Cambridge (GB)

(*) Notice: Subject to any disclaimer, the term of this patent is extended or adjusted under 35 U.S.C. 154(b) by 56 days.

(21) Appl. No.: 11/721,512

(22) PCT Filed: Dec. 2, 2005

(86) PCT No.: PCT/GB2005/050228

§ 371 (c)(1), (2), (4) Date: Jul. 12, 2007

(87) PCT Pub. No.: WO2006/067521

PCT Pub. Date: Jun. 29, 2006

(65) Prior Publication Data

US 2008/0224635 A1    Sep. 18, 2008

(30) Foreign Application Priority Data

Dec. 20, 2004 (GB) .................. 0427744.8

(51) Int. Cl.
G05F 1/00 (2006.01)
H05B 37/02 (2006.01)

(52) U.S. Cl. .................... 315/308; 315/307

(58) Field of Classification Search ............ 315/50, 315/112, 117, 118, 246, 251, 291, 307
See application file for complete search history.

(56) References Cited

U.S. PATENT DOCUMENTS

| 6,229,271 | B1 | 5/2001 | Liu | |
| 7,038,399 | B2* | 5/2006 | Lys et al. | 315/291 |
| 7,132,805 | B2* | 11/2006 | Young | 315/308 |
| 7,233,831 | B2* | 6/2007 | Blackwell | 700/17 |
| 7,393,119 | B2* | 7/2008 | Lebens et al. | 362/205 |
| 2004/0169477 | A1 | 9/2004 | Yanai et al. | |

FOREIGN PATENT DOCUMENTS

| DE | 20121470 U1 | 10/2002 |
| EP | 0574993 | 12/1993 |
| EP | 1164819 A | 12/2001 |
| GB | 1292314 | 10/1972 |
| JP | 06-176878 A | 6/1994 |
| JP | 06-290876 A | 10/1994 |
| JP | 2001143880 | 5/2001 |

OTHER PUBLICATIONS

WIPO, International Preliminary Report on Patentability, PCT Application No. PCT/GB2005/050228 issued Jun. 26, 2007.

* cited by examiner

Primary Examiner—Douglas W Owens
Assistant Examiner—Dieu A. Minh
(74) Attorney, Agent, or Firm—Barnes & Thornburg LLLP

(57) ABSTRACT

An apparatus for controlling two light sources using an input voltage from a mains light dimmer, the light sources comprising a first light source configured to emit light having a second colour temperature, wherein the second colour temperature is higher than the first colour temperature, the apparatus comprising an input connection for receiving the input voltage from the mains light dimmer, a sensor for sensing a value voltage of the input voltage, driving means for driving the light sources, and a controller for controlling the driving means responsive to said sensing.

21 Claims, 3 Drawing Sheets

LIGHTING APPARATUS AND METHOD

CROSS-REFERENCE TO RELATED PATENT APPLICATIONS

This patent application is a U.S. Nationalization of international patent application no. PCT/GB2005/050228, filed Dec. 2, 2005, which claims priority to United Kingdom patent application No. GB 0427744.8, filed Dec. 20, 2004, all of which applications are expressly incorporated herein by reference in their entirety.

BACKGROUND OF THE INVENTION

The present invention relates to improvements in lighting systems, in particular lighting systems having variable colour temperature.

Lighting systems having variable colour temperature are known in the art for improved comfort in office and domestic situations, and typically incandescent bulbs used in the evening have a lower colour temperature than the fluorescent lamps more commonly used during the day. The Solux Lamp (www.soluxtli.com) is a 'cool' light bulb, using a special coating, to emit light having a colour temperature of around 4700K. However, when dimmed this light source appears too blue at low light intensities, and for improved effectiveness of treatment and comfort a multiple light source approach is preferred.

Background prior art may be found in WO 96/28956, JP 05-121176, JP 04-206391, DE 3526590, JP 03-226903, EP 0545474, DE 3916997, U.S. Pat. No. 3,180,978, FR 2151121 and WO 85/01566. However, one problem with systems in the prior art is that they require new control wiring, extra mountings for light sources of different colour temperatures and sometimes special control means such as light sensors mounted on the outside of houses. Typically, prior art systems require at least two separate lighting circuits for controlling light sources of different colour temperatures, making them incompatible with standard domestic lighting installations and increasing the cost of providing artificial illumination with a variable colour temperature.

It would be advantageous to provide a lighting system with variable colour temperature capability which could be used with standard office and domestic lighting circuits, including standard light dimmers. In particular, it would be advantageous to provide a plug-in replacement for existing light bulbs, incorporating a variable colour temperature facility for use with existing light dimmer circuits.

SUMMARY OF THE INVENTION

According to an aspect of the present invention, there is provided an apparatus for controlling two light sources using an input voltage from a mains light dimmer, the light sources comprising a first light source configured to emit light having a first colour temperature and a second light source configured to emit light having a second colour temperature, wherein the second colour temperature is higher than the first colour temperature, the apparatus comprising an input connection for receiving the input voltage from the mains light dimmer, a sensor for sensing value of the input voltage, driving means for driving the light sources, and a controller for controlling the driving means responsive to said sensing.

The voltage output waveform from a mains dimmer may vary depending on the dimmer design. One method of determining the power level set on the dimmer is to determine the root mean square voltage from the dimmer, since this provides the power level delivered to a purely resistive load. The sensor may sense the average voltage directly; alternatively it may measure the instantaneous voltage at the mains input at intervals over a time period and determine the average voltage. As a further alternative it may sense the average voltage indirectly, for example by sensing a duty cycle of the waveform.

The apparatus may control the light sources so that, as the average voltage from the mains dimmer is increased from zero to a reference voltage (between one third and two thirds the supply voltage of the mains utility supply, for example, one half the supply voltage), the first light source increases in brightness. As the average voltage is further increased from the reference voltage to a maximum voltage (for example 230V in the UK and most of Europe, 115V in the United States of America), the second light source may increase in brightness while the first light source decreases in brightness, so that the overall brightness from the light sources appears to a human observer to be substantially constant. Because the two light sources emit light having different colour temperatures, the overall colour temperature of the light emitted may increase from the first colour temperature to the second colour temperature as the average voltage increases from the reference voltage to the maximum voltage.

The driving levels for the two light sources may be obtained from a look up table, which may be configured to account for different light source types and different transfer curves. Alternatively, the first light source may be controlled in proportion to the average voltage minus the reference voltage, so that between zero and the reference voltage the first light source is off, and between the reference voltage and maximum the first light source is turned on. The second light source may be controlled in proportion to a difference between the average voltage and the reference voltage, so that the second light source is at maximum intensity at the reference voltage, and as the average voltage changes either greater than or less than the reference voltage, the intensity of the second light source decreases.

According to another aspect of the invention, there is provided a light source configured to provide light of a variable colour temperature, the light source comprising a power input to receive an input supply, a first source of illumination, a second source of illumination, and a controller, coupled to said power input and to said first and second illumination sources, wherein said controller is configured to provide a variable drive to said first and second illumination sources dependent upon said input supply to provide said variable colour temperature light.

The controller may be configured so that over a part of a range of the variable colour temperature, the overall brightness from the light source to a human observer remains substantially constant. The controller may be configured so that the sum of the luminous flux (measured in lumens) output by the first source of illumination and the luminous flux output by the second source of illumination is substantially constant. Alternatively, the controller may be configured so that the sum of the illuminance (measured in lux) output by the first source of illumination at a particular distance and the illuminance output by the second source of illumination at the same distance is substantially constant.

According to a further aspect of the invention, there is provided a light bulb having a plurality of light sources, the light sources comprising a first light source configured to emit light having a first colour temperature and a second light source configured to emit light having a second colour temperature, wherein the second colour temperature is higher than the first colour temperature.

By light bulb we preferably means a plug-in replacement for a conventional filament light, fluorescent tube or other light source.

The first light source and second light source may be of different types. For example, one may comprise a plurality of LEDs and the other may comprise a filament type source. Alternatively, either or both light sources may comprise fluorescent light sources. Under predetermined conditions, such as driving voltage and/or driving current, the first light source emits light having a lower colour temperature than the second light source. These conditions may be different for the two light sources, particularly if they are of different types. For example, a filament light source may have a higher voltage rating than an LED. When operated at their respective rated driving conditions, the colour temperature of the light emitted from the second light source is greater than that of the light emitted from the first light source.

Preferably the first colour temperature is less than 3000K and the second colour temperature is greater than 5000K. For example, the first colour temperature may be 2700K (which may be known as a 'warm' light source) and the second colour temperature may be 5500K (which may be known as a 'cool' light source).

The light bulb may comprise a circuit for controlling the light sources using an input voltage from a mains dimmer. This may be useful so that the light bulb comprises a plug-in replacement for an ordinary light bulb, wherein the colour temperature of the light emitted from the bulb is adjustable separately from the intensity.

According to another aspect of the present invention, there is provided a circuit for controlling a plurality of light sources using an input voltage from a light dimmer, the circuit comprising an input connection for receiving a power control signal from the light dimmer, a voltage sensor for sensing said power control signal, driving means for driving the plurality of light sources, and a controller for controlling the driving means responsive to said sensing.

Preferably the circuit provides light of a variable colour temperature. Preferably the light sources comprise a first light source having a first colour temperature and a second light source having a second, higher colour temperature. Preferably the controller provides a variable drive to the first and second light sources dependent upon an average value of said input voltage to provide variable colour temperature light. Here the average includes R.M.S. voltage values, e.g. in the case where the dimmer varies the proportion of the mains cycle applied.

The circuit may be connected to the light dimmer and to two light sources, wherein one light source emits light having a higher colour temperature than the other light source. Light sources arranged to emit light having intermediate colour temperatures may also be utilised to provide improved variation in colour temperature between the two extremities. Preferably the dimmer is a mains light dimmer, that is a dimmer for dimming mains powered lighting (though, as described below, such a dimmer may provide a variable low-voltage control signal rather than variable mains power).

According to a further aspect of the invention, there is provided a method of controlling a plurality of light sources using a common input voltage to provide light of a variable colour temperature, the light sources comprising a first light source configured to emit light having a first colour temperature and a second light source configured to emit light having a second colour temperature, wherein the second colour temperature is higher than the first colour temperature, the method comprising sensing a value of the input voltage, and controlling the two light sources responsive to said sensing to provide a variable drive to said first and second light sources dependent upon said average value to provide a first portion of a control range wherein the colour temperature of the light changes and the observed brightness is substantially constant.

Controlling the two light sources may additionally provide a second portion of the control range wherein the observed brightness changes and the colour temperature may remain constant, or may change substantially with the brightness.

One method of sensing the average voltage is to measure the instantaneous voltage at intervals over a time period and determine the average voltage from those measurements. Another method is to sense a duty cycle of the mains voltage waveform and determine the average voltage from the duty cycle.

The invention may be embodied in computer program code. In another aspect, therefore, the invention provides such code on a carrier medium such as a floppy disk, configured to implement a method as described before. The invention also provides an integrated circuit, for example a microcontroller or a memory carrying such code.

In the above described apparatus, circuits and systems the dimmer may be of the type which supplies a dc control voltage for use in association with a (normally separate) mains power supply. In this case, for example, the circuit may provide variable drive outputs for controlling, say, a pair of fluorescent lamp ballast units for driving a respective pair of fluorescent lights of a different colour temperature. The ballast units may be of the type which have as inputs mains power and a 0-10v control signal and which provide a fluorescent lamp drive output in accordance with the control signal e.g. the Huco Limited 09-7570. The input voltage to which the apparatus/circuit is sensitive may be this type of dc control signal.

Generally we have referred above to driving two light sources of different colour temperature but the skilled person will understand that three or more light sources may be employed, potentially some having the same or overlapping colour temperature.

BRIEF DESCRIPTION OF THE DRAWING FIGURES

These and other aspects of the invention will now be further described, by way of example only, with reference to the accompanying drawings in which.

DETAILED DESCRIPTION OF THE INVENTION

Figure 1:
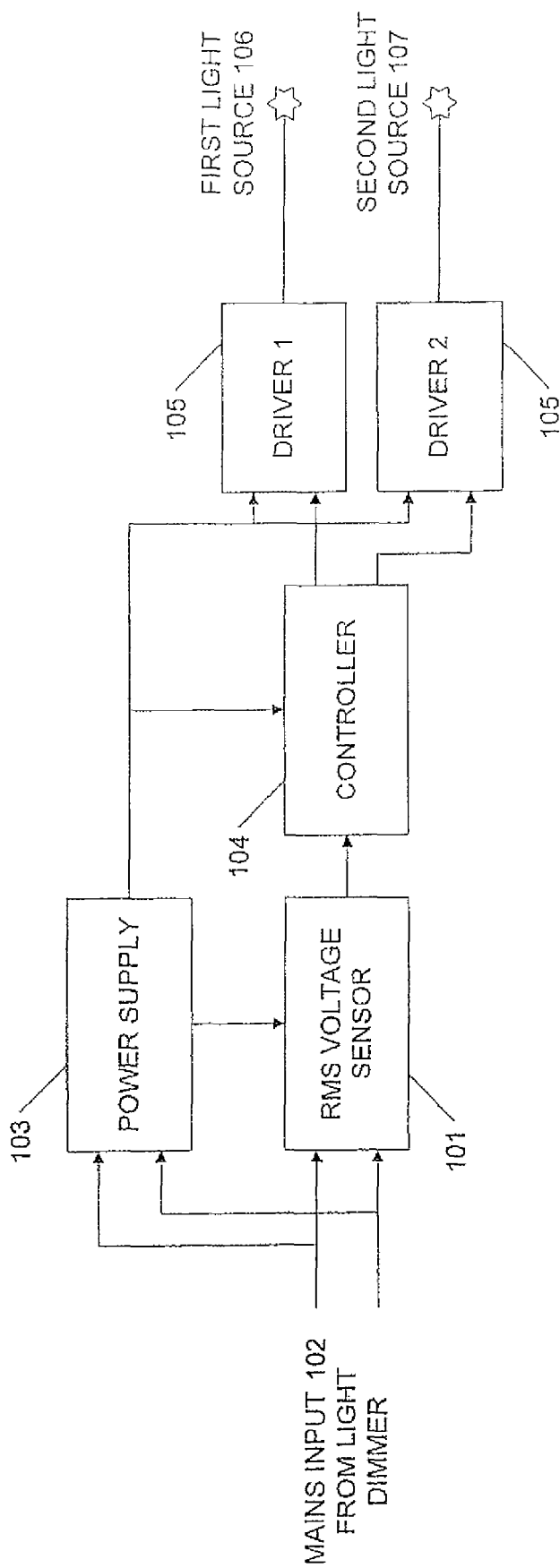
FIG. 1 shows a block diagram of an apparatus for variable colour temperature control.

The block diagram in FIG. 1 shows an apparatus suitable for incorporating into a light bulb for connection to a mains supply via a conventional light dimmer. There are a number of different light dimmer designs on the market, for example, leading-edge dimmers, trailing-edge dimmers, pulse width modulation (PWM) dimmers and resistive dimmers. It is preferable that the apparatus be able to function with any type of dimmer circuit.

A voltage sensor (101) is connected to the mains input (102) and is used for detecting the average voltage of the input, for example the root mean square average, thereby providing an output indicative of the power level set on the dimer. Alternatively a duty cycle sensor could be used, which determines the power level set on the dimmer by sensing the portion of the mains cycle during which power is turned on. This is particularly suitable for leading-edge and trailing-edge type dimmers. A controller (104) is connected to the output of the voltage sensor and to the input of at least two light source drivers (106 & 107). A simple power supply circuit (103), for example a circuit employing a Zener diode, may be connected to the mains input to provide a stable voltage output for the light source drivers. However, a power supply circuit is not essential as the controller and light source drivers may be configured to accept power directly from the mains input or through a full- or half-wave rectifier. The apparatus may be used in conjunction with low voltage light sources, such as LEDs, so that a significant voltage headroom may be available.

The function of the control circuit is to provide different drive level signals to the first light source and the second light source, so that when the power level setting on the mains dimmer is increased from zero, the intensity of the first light source is raised to a maximum value while keeping the intensity of the second light source substantially at zero, then with still further increasing power level from the mains dimmer, reducing the intensity of the first light source while increasing the intensity of the second light source from zero to a maximum value.

The first light source may comprise a low colour temperature light source (also known as a 'warm' light source), such as an LED, fluorescent light or filament bulb, having a colour temperature under normal operating conditions of around 3000K, preferably 2700K. The second light source is a higher colour temperature light source (also known as a 'cool' light source), which may also comprise an LED, fluorescent light or filament bulb, having a colour temperature of around 5000K, preferably 5500K. As the setting on the light dimmer is increased from zero, the brightness from the first light source increases. When the average voltage on the mains input reaches a predetermined reference voltage (for example a fraction of the mains utility supply voltage such as one half the mains utility supply voltage), the first light source is at maximum brightness. For power level settings above this level, the overall brightness from the bulb may remain substantially constant and the colour temperature may increase, as the brightness from the second light source increases and the brightness from the first light source decreases.

Note that the 'power level setting' on the mains dimmer refers to the power provided to a conventional light bulb or a purely resistive load. The power provided to this circuit may in fact increase, remain substantially constant or decrease as the average voltage increases from the reference voltage to the maximum supply voltage. This depends in part upon the rating of the first and second light sources and the amount of light output produced by each. If the second light source is more efficient than the first light source, the power required by the circuit to operate at maximum voltage may be less than at the reference voltage.

Figure 2:
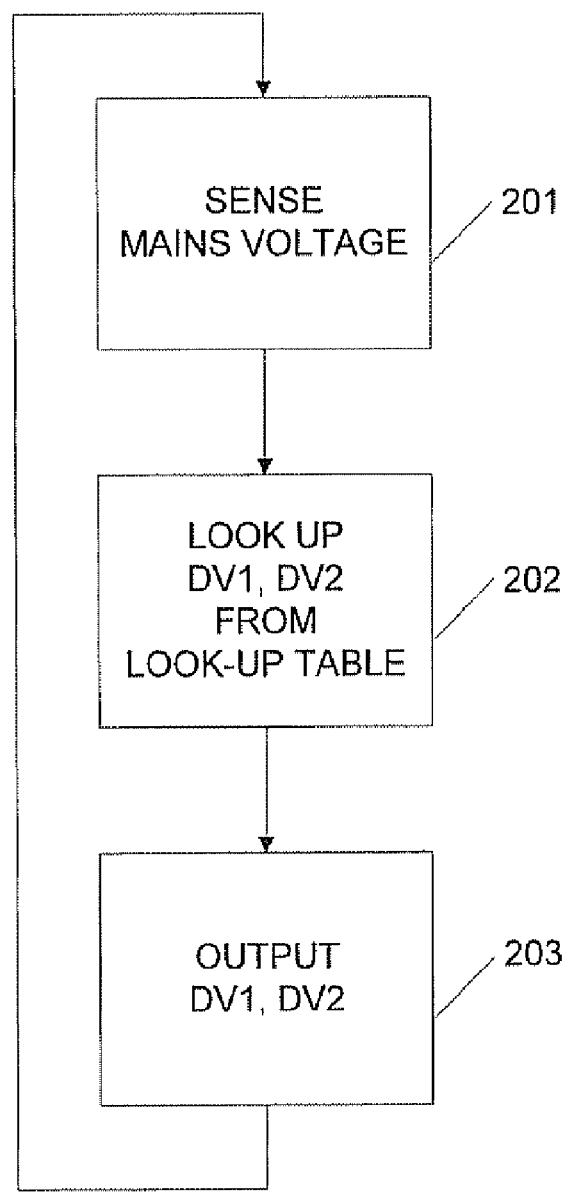
FIG. 2 shows a flow chart for a method used in the controller in the block diagram of FIG. 1.

The controller may utilise a microprocessor or may be designed using analogue electronics such as transistors and op-amps. FIG. 2 shows a method suitable for use in a microprocessor controller design. In the first step (201) a reading is taken from the voltage sensor and the power level setting of the mains dimmer determined. Since there is a large variety of voltage wave forms output by different mains dimmer designs, the microprocessor may execute program code to calculate the power level setting of the dimmer, for example over a period of several mains cycles, thereby avoiding problems with instantaneous voltage level variation due to chopped mains voltage waveforms.

In the second step (202) the micro controller may utilise a look up table to obtain drive levels for first and second light sources. A suitable length for the look up table might be 256 entries (appropriate for an 8 bit digital to analogue converter in the voltage sensor). The look up table is configured to first increase the intensity of first light source in response to increasing mains dimmer power, then increase the intensity of the second light source while decreasing the intensity of the first light source.

Finally in the third step (203) the drive levels for the light sources are output to the light source drivers. The two light sources may operate at different voltage levels, current levels or overall power levels. This may be provided for in the light source drivers, or alternatively in the look up table of the controller. In the first example, the same look up table may be used with different light sources by matching appropriate light source drivers for the particular light sources used. In the second example, identical light source drivers may be used for all light sources, and the look up table changed to suit the particular combination of light sources used in a design. Thus if the light sources are changed, the same light source drivers can be used with the new light sources, and only an update of the look up table ROM is required.

In an alternative embodiment the controller in FIG. 1 may be constructed from analogue components such as op-amps and transistors. The function of such a controller design is the same as using a microprocessor, but is hard-wired. One advantage of using a microprocessor is that the program code (optionally incorporating the look up table) may be changed for different light sources or different reference voltages and maximum voltages whereas a hard-wired design may be suitable for only one implementation. In particular, the look up table may also be changed for different light intensity and colour temperature curves and also for different light dimmer power level curves. Leading-edge and trailing-edge dimmers may produce a different power level transfer curve than PWM dimmers, and some light sources may be more linear than others in their intensity variation against driving voltage. Look up tables may be compiled to take account of any or all of these effects. Non-linear circuits are also possible with analogue electronics, for example using diodes to approximate an exponential transfer curve.

Figure 3:
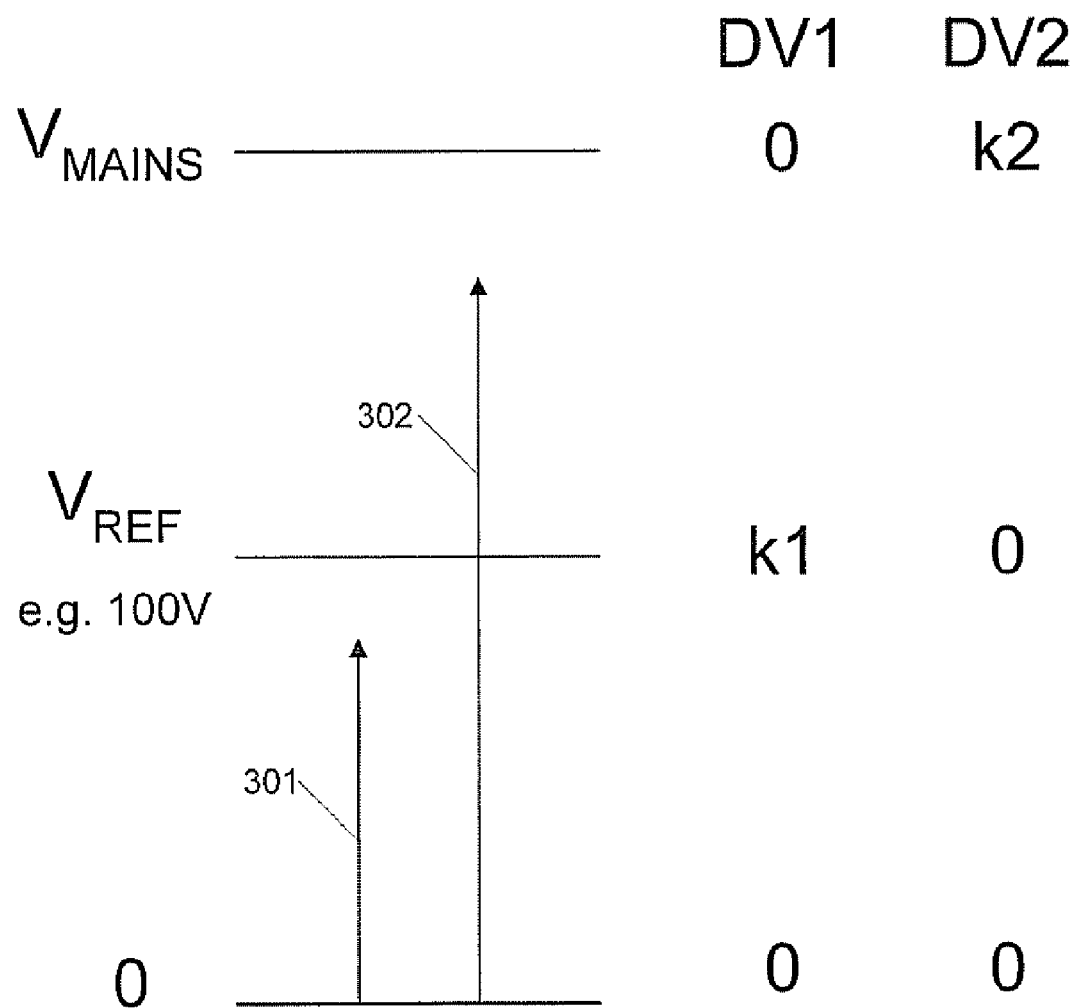
FIG. 3 shows an example of a driving voltage scheme used to provide a variable colour temperature control.

FIG. 3 shows two example average voltage settings of the mains input from the dimmer. At 301 the dimmer is set to slightly less than the reference voltage, at approximately 80V. The first light source is at approximately 80% intensity and the second light source is off in this example. At 302 the dimmer is set to between the reference voltage and the maximum mains voltage, at approximately 190V. The first light source is at approximately 30% intensity and the second light source is at approximately 70% intensity. The driving voltages may vary linearly between the references on the Figure (k1 being full intensity for the first light source and k2 being full light intensity for the second light source), or they may vary non-linearly in order to take account of non-linearities in the voltage-intensity curves of the light sources and/or the power level against dimmer position curve of the light dimmer. Example equations for linear relationships between the references on FIG. 3 are shown below.

$$DV1 = \left(\frac{V_{AVERAGE}}{V_{REF}}\right) \cdot k1 \qquad 0 \leq V_{AVERAGE} \leq V_{REF}$$

$$DV2 = 0$$

$$DV1 = \left(1 - \frac{DV2}{k2}\right) \cdot k1 \qquad V_{REF} \le V_{AVERAGE} \le V_{MAINS}$$

$$DV2 = \left(\frac{V_{AVERAGE} - V_{REF}}{V_{MAINS} - V_{REF}}\right) \cdot k$$

$V_{REF}$ may be, for example, 100V. The driving voltages may be arranged so that between the reference voltage and the maximum supply voltage, the sum of the luminous flux output by the first light source and that output by the second light source is constant.

Lumens(S1)+Lumens(S2)=const

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. An apparatus for controlling two light sources using an input voltage from a mains light dimmer, the light sources comprising a first light source configured to emit light having a first colour temperature and a second light source configured to emit light having a second colour temperature, wherein the second colour temperature is higher than the first colour temperature, the apparatus comprising:
   an input connection for receiving said input voltage from the mains light dimmer;
   a sensor for sensing a value of said input voltage;
   driving means for driving the light sources; and
   a controller for controlling the driving means responsive to said sensing,
   wherein the controller is configured to control the driving means such that, over at least part of a range of said average voltage, an overall brightness of said light sources to a human observer is substantially constant whilst a colour temperature of light from the combined sources changes.

2. The apparatus according to claim 1, wherein the sensor comprises a voltage sensor and said sensed value comprises an average voltage of said input voltage.

3. The apparatus according to claim 1, wherein the sensor comprises a duty cycle sensor.

4. The apparatus according to claim 1, wherein the sensor is configured to determine the root mean square voltage of the input voltage.

5. The apparatus according to claim 1, wherein the controller comprises:
   means for looking up a first control voltage and a second control voltage responsive to said sensing; and
   means for outputting the first control voltage and second control voltage to the driving means.

6. The apparatus according to claim 1, wherein the controller comprises:
   means for controlling the first light source in proportion to the average voltage minus a reference voltage; and
   means for controlling the second light source in proportion to a difference between the average voltage and the reference voltage.

7. A light source configured to provide light of a variable colour temperature, the light source comprising:
   a power input to receive an input supply;
   a first source of illumination;
   a second source of illumination; and
   a controller, coupled to said power input and to said first and second illumination sources; and
   wherein said controller is configured to provide a variable drive to said first and second illumination sources dependent upon said input supply to provide said variable colour temperature light and wherein said controller is configured to control said illumination sources such that, over at least a part of a range of said variable colour temperature of said light, overall brightness from said light source to a human observer remains substantially constant.

8. A light bulb having a plurality of light sources, the light sources comprising a first light source configured to emit light having a first colour temperature and a second light source configured to emit light having a second colour temperature, wherein the second colour temperature is higher than the first colour temperature and wherein over at least a part of arrange of an input voltage, an overall brightness of said light source to a human observer is substantially constant whilst a colour temperature of light from the combined sources changes.

9. The light bulb according to claim 8, wherein the first light source is configured to emit said light having a first colour temperature under a first predetermined condition, and the second light source is configured to emit said light having a second colour temperature under a second predetermined condition.

10. The light bulb according to claim 8, wherein the first colour temperature is less than 4000K and the second colour temperature is greater than 4000K.

11. The light bulb according to claim 10, wherein the first colour temperature is less than 3000K and the second colour temperature is greater than 5000K.

12. The light bulb according to claim 8, wherein the light bulb further comprises a circuit for controlling the light sources using an input voltage from a mains light dimmer, the circuit comprising:
   an input connection for receiving power from the mains light dimmer;
   a sensor for sensing an average voltage of the input voltage;
   driving means for driving the light sources; and
   a for controlling the driving means responsive to said sensing.

13. A circuit for controlling a plurality of light sources using an input voltage from a mains light dimmer to provide light of a variable colour temperature, the light sources comprising a first light sauce configured to emit light having a first colour temperature and a second light source configured to emit light having a second colour temperature, wherein the second colour temperature is higher than the first colour temperature, the circuit comprising:
   an input connection for receiving an input voltage from the mains light dimmer;
   a sensor coupled to the input connection for sensing said input voltage;
   driving means coupled to the input connection for connecting to the plurality of light sources for driving the light sources; and
   a controller for controlling the driving means responsive to said sensing to provide a variable drive to said first and second light sources dependent upon an average value of said input voltage to provide said variable colour temperature light,
   wherein the controller is configured to control the driving means such that, over at least part of a range of said average voltage, an overall brightness of said light sources to a human observer is substantially constant whilst a colour temperature of light from the combined sources changes.

14. The circuit as claimed in claim 13, wherein said input is configured to receive mains power for said light sources.

15. The circuit as claimed in claim 13, wherein the sensor is configured to sense a level of said received mains power, in particular an average voltage value of said mains power.

16. A method of controlling a plurality of light sources using a common input voltage to provide light of a variable colour temperature, the light sources comprising a first light source configured to emit light having a first colour temperature and a second light source configured to emit light having a second colour temperature, wherein the second colour temperature is higher than the first colour temperature, the method comprising:

sensing value of the input voltage; and controlling the two light sources responsive to said sensing to provide a variable drive to said first and second light sources dependent upon said average value to provide a first portion of a control range wherein the colour temperature of the light changes and the observed brightness is substantially constant.

17. The method according to claim 16, wherein said sensing comprises measuring an average value, in particular a root mean square voltage of the input voltage.

18. The method according to claim 16, wherein said sensing comprises measuring a duty cycle of the input voltage.

19. The method according to claim 16, wherein said controlling comprises:

looking up a first control voltage and a second control voltage corresponding to the average voltage in a lookup table; and outputting the first control voltage to the first light source and the second control voltage to the second light source.

20. The method according to claim 16, wherein said controlling comprises:

controlling the first light source in proportion to the average voltage minus a reference voltage; and controlling the second light source in proportion to a difference between the average voltage and the reference voltage.

21. A circuit configured to implement the method of claim 16.

* * * * *